Oct. 1, 1963  F. LOY  3,105,905
INFRARED DETECTOR INCLUDING FILTER MEANS TO
COMPENSATE FOR PARASITIC RADIATION
Filed Feb. 24, 1959  4 Sheets-Sheet 1
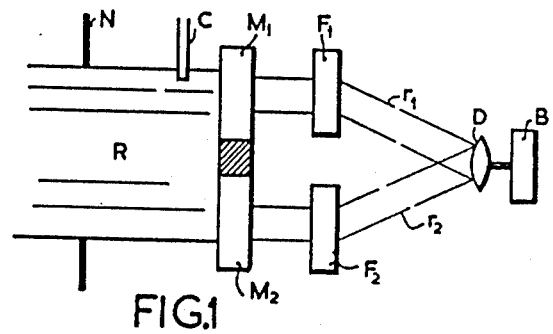
FIG.1
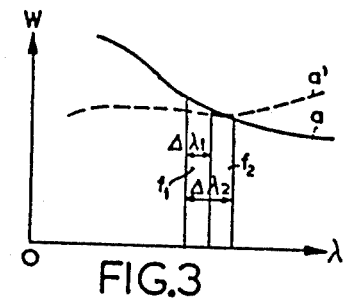
FIG.2
FIG.3
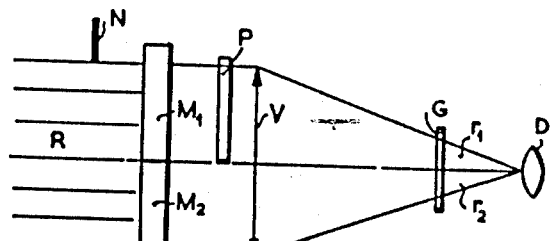
FIG.4
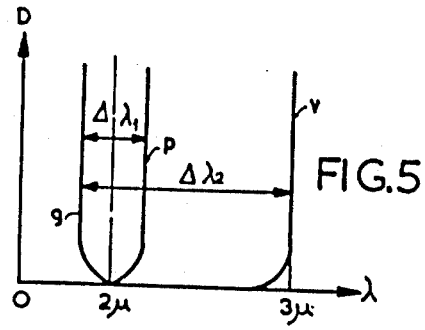
FIG.5
INVENTOR
FERNAND LOY
BY
AGENT

INVENTOR
FERNAND LOY

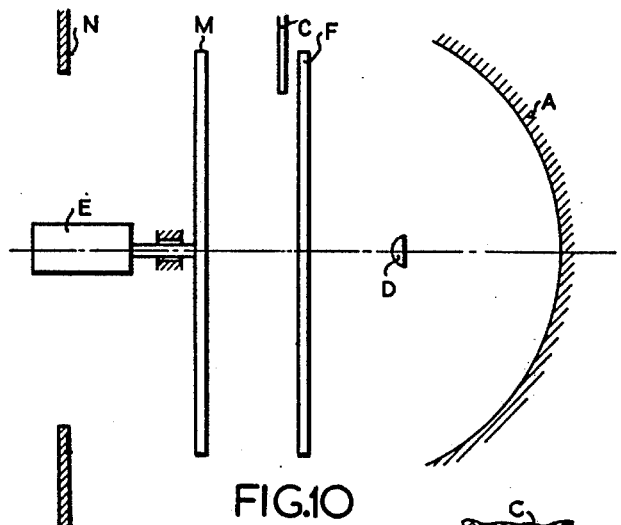
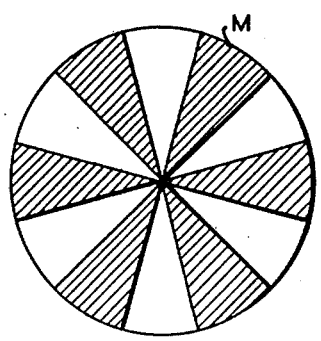
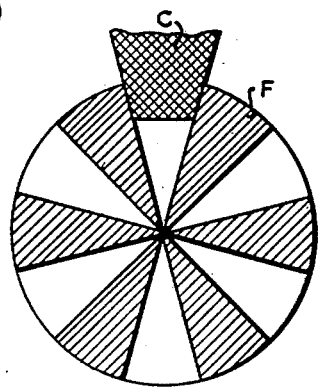
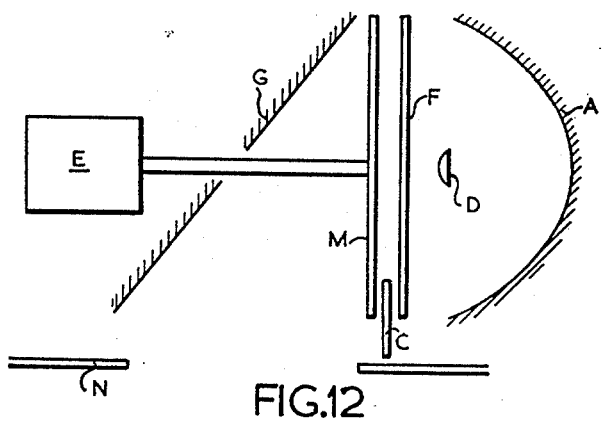

United States Patent Office 3,105,905
Patented Oct. 1, 1963

3,105,905
INFRARED DETECTOR INCLUDING FILTER MEANS TO COMPENSATE FOR PARASITIC RADIATION
Fernand Loy, Neuilly-sur-Seine, France, assignor to North American Philips Company, Inc., New York, N.Y., a corporation of Delaware
Filed Feb. 24, 1959, Ser. No. 794,978
Claims priority, application France Mar. 4, 1958
1 Claim. (Cl. 250—83.3)

This invention relates to devices to determine radiations, of which the spectrum has one or more parts in common with the spectrum of a parasitic radiation.

The device according to the invention is suitable to detect a radiation with a constant or a variable intensity, which is superimposed on a radiation, of which the spectral distribution differs from that of the radiation to be detected. Although certain precautions are taken to eliminate the influence of variations of the spectral energy distribution of the stray radiation in the sensitivity range of the detector, it will be assumed that this spectral distribution is not subjected to rapid variations with respect to the detection time of all wavebands.

It will furthermore be assumed that the beams observed are homogeneous, i.e. that the spectral energy distribution is the same at all points of the cross-section of all beams.

The invention has for its object to provide a device which ensures an improvement in the fulfilment of the practical requirements and which has a simple structure and a satisfactory safety in operation.

In accordance with the invention provision is made of means to derive from the luminous beam entering through an aperture of the device two beams having bands of different wavelengths, these beams being modulated and projected onto the same part of the sensitive surface of a detection element, provision being furthermore made of means to adjust the output voltage to a constant value, if only the stray radiation prevails, and to detect the variable component which occurs owing to the radiation to be determined.

The invention is intended, more particularly, for use in detecting overheated bearings of railway carriages.

The invention will now be described more fully with reference to the drawing, in which FIG. 1 shows the principal diagram of a device according to the invention.

FIG. 2 shows how the output voltage of the detector may vary.

FIG. 3 shows the curves of the spectral energy distribution of the stray radiation before and after the passage by selective members.

FIG. 4 is a diagram of a device according to one embodiment of the invention, for detecting the temperature of a hot body having a temperature of less than 200° C.

FIG. 5 shows the curves of the spectral densities of the substances used in the device shown in FIG. 4 for selection.

FIG. 10 shows a device comprising a hollow mirror.

FIGS. 11a and 11b show details and

FIG. 12 shows a modification of the device.

Figure 6A:
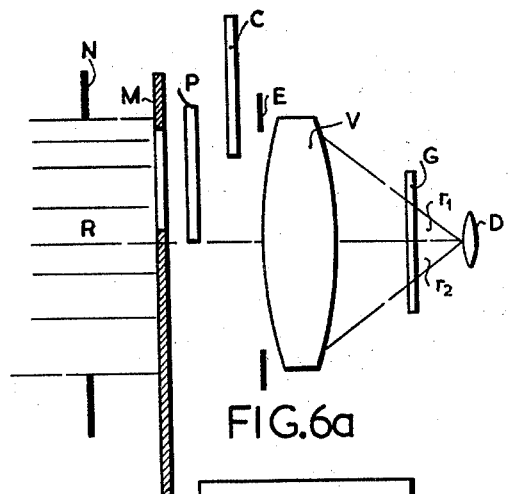
FIG. 6a shows the section of a device according to the invention, which comprises a rotating disc.

It has been suggested to use a device having two light-sensitive elements. It is difficult in this case to have constant spectral characteristic curves. Morever, a differential amplifier is required.

The device according to the invention has the advantage that it requires only a single detection element and that the amplifier may be an alternating voltage amplifier.

Referring to FIG. 1, reference R designates a beam of radiation passing through the diaphragm N. This beam is homogeneous. $M_1$ and $M_2$ designate optical modulators, which modulate in a given manner the intensities of the passing beams. A Kerr cell may be used as a modulator; as an alternative use may be made of a modulator in which the light beam passes through a germanium crystal. Furthermore, modulators may be employed which are provided with a rotating disc with slots.

$F_1$ and $F_2$ denote selection members, through which pass the modulated light beams. These members allow different wavebands to pass; they may be, for example, filters or selectively reflecting surfaces. The passing, modulated beams $r_1$ and $r_2$ comprise, therefore, various wave-bands. The beam $r_1$ imparts to the detector D a flux $\varphi_1$; thus, in the absence of the radiation $r_2$, an electric voltage $u_1$ is produced at the output of the detector. In the same manner $r_2$ imparts a flux $\varphi_2$, which produces a voltage $u_2$ at the output of the detector, in the absence of $r_1$.

With a suitable choice of the spectral characteristic curves of the selectors $F_1$ and $F_2$, of the detector D and of the variation of the intensities owing to the modulators $M_1$ and $M_2$, it may be ensured, for example by adjusting, with the aid of the screen C, the intensity of the beam $r_1$, that, if the beam R has a given spectral composition, the voltage $u_1+u_2$ is a direct voltage.

In accordance with the invention the adjustment is such that in the absence of the radiation to be detected, the stray radiation produces a direct voltage $u_1+u_2$.

If it is assumed that only one of the selection members $F_1$ or $F_2$ passes part of the radiation to be detected, when it is superimposed on the parasitic radiation, the voltage $u_1+u_2$ does not remain a direct voltage. A variable voltage $u_1+u_2$ thus indicates the presence of a radiation to be detected. B designates a detector or a member for measuring a variable component of the voltage $u_1+u_2$. Although not definitely required, periodically operative modulators are used to simplify the construction of the detection member B, which, in this case, need be sensitive only to a fixed alternating voltage, which is determined by the frequency of the modulators.

If the radiation to be detected passes only through one of the selection members $F_1$ or $F_2$ and if the characteristics of the selection member and of the detector are known, it is possible to derive from the measurement of the variable component of the voltage $u_1+u_2$, the intensity of the radiation to be detected in the waveband of the selector concerned.

FIG. 2 illustrates the variation of the voltage $u_1+u_2$ with time for the case in which the modulators produce periodical, rectangular luminous pulses.

The numerals 1, 2, 3, 4 indicate the pulses with the amplitude $U_1$ of the first beam, the numerals 1', 2', 3', 4' the pulses with the amplitude $U_2$, corresponding to the second light beam.

The voltage $u_1+u_2$ will only be a direct voltage, if the amplitudes $U_1$ and $U_2$ are equal to each other. This condition may be realized by varying the flux of one of the beams.

In order to ensure, with given modulators $M_1$ and $M_2$ and with an adjustment of the sum of $u_1+u_2$ to a constant value, that, if only parasitic radiation prevails, the adjustment remains correct, the voltages $u_1$ and $u_2$ should vary proportionally to the radiations $f_1$ and $f_2$. Otherwise it is necessary that the energy quantities corresponding to a given wavelength, inside the sensitivity range of the detector, should vary proportionally for the radiation $f_1$ and $f_2$ respectively. Since $r_1$ and $r_2$ are derived from the parasitic radiation, this means that the spectral energy distribution of the parasitic radiation, inside the sensitivity range of the detector, is allowed to vary only little during the course of the observation or else that the selection members $F_1$ and $F_2$ should determine adequately narrow, adjacent bands of the spectrum.

Referring to FIG. 3 $a$ designates the curve for the spectral energy distribution of the parasitic radiation, showing the energy W as a function of wavelength $\lambda$. The rectangles $f_1$ and $f_2$ represent the energy quantities of the radiation subsequent to passage through the selection members $F_1$ and $F_2$.

With adequately small widths $\Delta\lambda_1$ and $\Delta\lambda_2$ of the rectangles $f_1$ and $f_2$ respectively the energy quantities transferred by the two bands vary little in relative values, even if the curve $a$ varies strongly and becomes, for example, curve $a'$. It is the more important to use selection members $F_1$ and $F_2$ with narrow pass bands, according as the spectral energy distribution of the parasitic radiation varies more strongly.

With a device according to the invention, intended to determine, in the presence of sun beams, the infrared radiation from a device having a temperature of less than 200° C., the selection member was a device comprising an optical system of glass, a planoparallel plate of an acrylic resin, known by the trademark "Plexiglas," and a planoparallel plate formed by a monocrystal or a polycrystal of germanium.

Instead thereof, use may be made of a germanium lens in conjunction with a Plexiglas plate and a glass plate. This has the advantage that a satisfactorily corrected optical system with a large aperture can be readily obtained.

FIG. 4 shows the section of a device according to the invention, which is particularly intended for detecting the infrared radiation of a body having a temperature of less than 200° C.

In FIG. 4 corresponding elements are designated by the same references as in FIG. 1. The detector D is an infrared-sensitive, lead-sulphide cell; P is a planoparallel plate of Plexiglas, G a similar plate of a germanium crystal, V an optical system of glass, which projects the beams through G onto the detector D.

FIG. 5 shows the curves of the spectral densities D as a function of wavelength $\lambda$ of the substances used in the device shown in FIG. 4; $g$, $p$ and $v$ designate the characteristic curves of the germanium, the Plexiglas and the glass respectively for the optical system V. The radiation $r_1$ passing through the plate P, the system V and the plate G has a spectrum extending over a band $\Delta\lambda_1$ between the curves $g$ and $p$, whereas the radiation $r_2$, which has not passed through the plate P, has a spectrum extending over the bands $\Delta\lambda_2$ between the curves $g$ and $v$. Two adjacent bands appear, which overlap each other in part, i.e. the bands $\Delta\lambda_1$ between the wavelengths 1.9 and 2.1$\mu$ and $\Delta\lambda_2$ between the wavelengths 1.9 and 3$\mu$. With respect to the parasitic radiation of sun beams, of which the spectral distribution in the range under consideration varies comparatively little, owing to the fact that the atmospheric absorption is little selective, the bands $\Delta\lambda_1$ and $\Delta\lambda_2$ may be considered to be narrow, so that the condition in which $u_1+u_2$ constitutes a direct voltage need not be readjusted each time.

The system V is chosen to be such that the beams $r_1$ and $r_2$ strike just the same spot of the sensitive surface of the detector D.

The radiation of a body having a temperature of less than 200° C. is located, after having passed through the optical system, almost completely in the band $\Delta\lambda_2$, which is not overlapped by $\Delta\lambda_1$. Thus, in order to determine the temperature of a body, the effect of stray radiation is first canceled by balancing the voltages $u_1$ and $u_2$ in the absence of desired radiation (i.e. from the body), by means of the screen C. When the two voltages are balanced, the output of the detector will be a direct voltage. Then, when radiation from the body is directed by the system V upon detector D, an alternating voltage output will be produced dependent upon the energy of the desired radiation and independent of stray radiation.

Figure 6B:
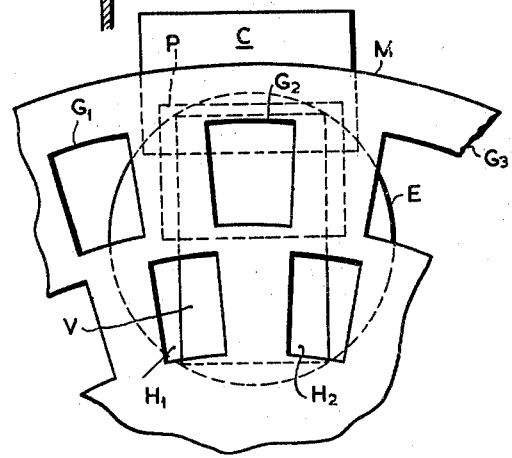
FIG. 6b is a front view of this device.

FIGS. 6a and 6b show a device according to the invention, corresponding members are designated by the same references as in FIG. 4. The diaphragm N is not shown in FIG. 6b. M designates a rotating disc having two sets of apertures $G_1$, $G_2$, $G_3$ and so on and $H_1$, $H_2$, $H_3$ and so on. When the disc rotates, these apertures discover in order of succession different portions of the system V. E denotes a screen which imparts a simple geometric shape to the opening of the system V.

The apertures $G_1$, $G_2$, $G_3$ disclose the portion of the system V covered by the plate P, whereas the apertures $H_1$, $H_2$, $H_3$ disclose directly a free portion of the system. The shape and the size of the apertures are chosen so that with the aid of the screen C, which covers to a greater or smaller extent the apertures $G_1$, $G_2$, $G_3$, the voltage $u_1+u_2$ becomes a direct voltage. This may also be achieved by displacing the disc with respect to the further part of the device or conversely.

Figure 7:
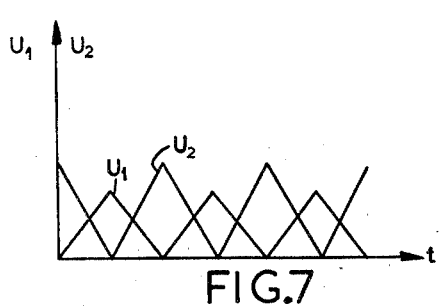
FIG. 7 shows the voltage variations at the output of the detector.

FIG. 7 shows the variations of the output voltages of the detector D, when the disc rotates regularly and the apertures are distributed uniformly along concentric circles of the disc. In FIG. 7 the voltage $u_1+u_2$ has an alternating-voltage component; this means that a different radiation is superimposed on the radiation adjusted. If the alternating-voltage component is in co-phase with $u_1$, the radiation under consideration has a higher energy quantity in the band $\Delta\lambda_1$ than the parasitic radiation. If the alternating-voltage component is in phase with $u_2$ the reverse takes place.

In order to assess the phase the component may be compared with a voltage derived from a magnet head arranged along the disc and producing an alternating voltage of which the phase corresponds to the position of the apertures with respect to the opening of the device.

Figure 8:
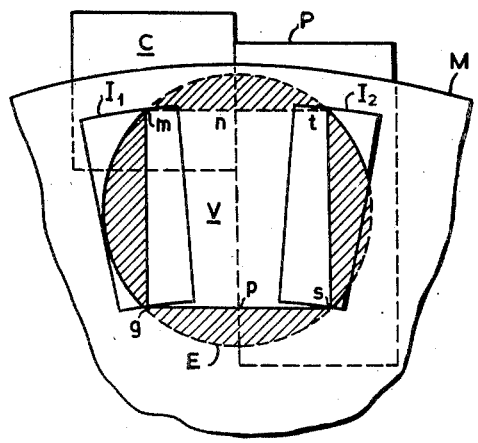
FIG. 8 is a front view of a modication with a rotating disc.

FIG. 8 shows a part of a modulator with a rotating disc M. The diaphragm N is not shown and the disc is provided with slots $I_1$, $I_2$ and so on. The system V is partly masked by a screen E, which leaves only two zones $mnpq$ and $ntsp$ free. The first zone is free, whereas the second is covered by the plate P. When the disc rotates the detector D is exposed in order of succession to the modulated light fluxes $\varphi_1$ and $\varphi_2$. These light fluxes are periodically modulated in phase opposition. Also in this case it is possible, with the aid of a screen C, to obtain a constant voltage $u_1+u_2$.

Figure 9:
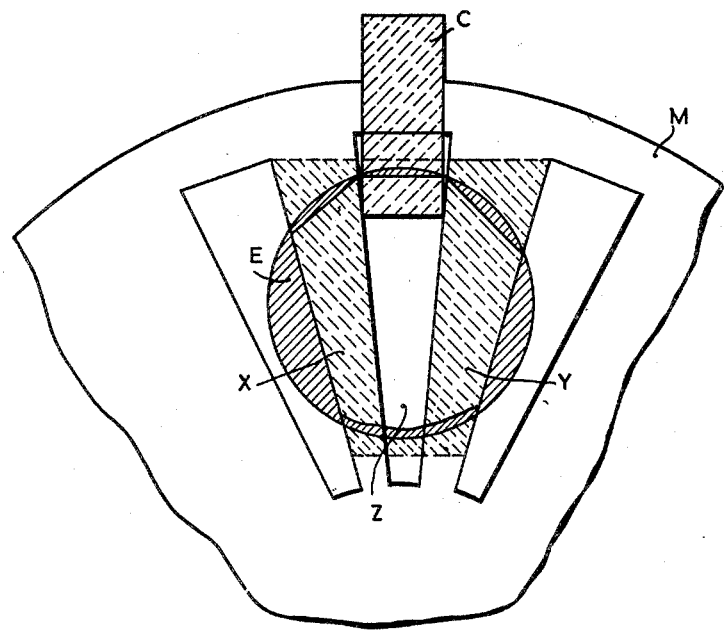
FIG. 9 is a front view of a third variant.

FIG. 9 shows a variant, in which the sides of the inlet surface of the optical system are covered by filters of Plexiglas X and Y. The central part Z remains free. The parts X and Y are disclosed simultaneously by means of two different slots of the modulating disc M. Since the screen E is octagonal, almost the whole surface of the optical system may be utilized. By means of the displaceable screen C the ratio of the light fluxes across the surfaces X and Y and through the surface Z may vary.

With the embodiments comprising rotating discs the modulators $M_1$ and $M_2$ of FIG. 1 are combined to form a single unit. It should be noted here that the selection members $F_1$ and $F_2$ may be combined with the modulators to form a single element, for example, by arranging the selection members on the rotating disc instead of on the optical system.

The modulation frequency is limited in its lower value by the duration of the detection. When considering the radiation of a moving body the passage of the body through the field of the device determines the modulation frequency, below which errors could be committed.

When detecting overheated axle bearings a frequency of 2000 c./s. has been found to be suitable. Such frequencies may be readily detected and amplified. The amplifier used to this end may be comparatively simple, since it need not amplify the direct-voltage component.

The amplifier and the device for determining the phase of the alternating-voltage component of $u_1+u_2$ are combined to form a single unit.

FIG. 10 shows a further variant. In this figure N designates the inlet aperture of the device and M denotes a modulator disc. The number of sectors of the disc and the speed of rotation are determined by the desired modulation frequency. The disc may comprise, for example, 40 sectors and rotate at a rate of 6000 revolutions a minute. Referring to FIG. 11, reference E designates the driving system of the disc, F denotes a disc which comprises the same number of sectors as the disc M, these sectors forming alternately free apertures and being made of a material such as Plexiglas. The axes of the discs M and F coincide with the optical axis of an elliptical mirror A, of which one of the focal points is located in the proximity of the detector D, whereas the other focal point is located in the range of the hot body, of which the radiation is determined to estimate the temperature. The screen C is arranged between the discs M and F.

FIGS. 11a and 11b are front views of the discs M and F. In FIG. 11a the hatched parts denote impervious sectors, whereas the further parts are pervious to light. In FIG. 11b the Plexiglas parts are indicated by cross-hatching; the other parts are free. FIG. 11b shows the screen C.

With this device the light flux to which the detector D is exposed emanates from beams modulated by the sectors of the disc M. These beams have different spectral compositions according as they have passed or have not passed through the Plexiglas sectors of the disc F. Upon a displacement of the screen C the intensity ratio of the beams is varied, so that in the presence of only parasitic radiation, the device can be adjusted to zero.

With a small size of the detector D it may be ensured that substantially the whole beam R, passing through the inlet aperture, strikes the detector D. Owing to the use of the hollow mirror A a high sensitivity is obtained, so that even weak radiations can be detected.

With a practical embodiment the diameter of the mirror A was 12 cms. and the focal points were located at distances of 6 cms. and 150 cms. from the top.

In order to increase the exposure times and, more particularly, in order to eliminate the losses brought about by the device E, the disc M may be provided at the periphery with a toothed rim, so that the central portion remains free.

With the device shown in FIG. 12 the same result is obtained partly by using a reflecting mirror, through the central part of which passes the driving shaft.

As a matter of course, the discs M and F may be interchanged in place. It is furthermore not necessary for the disc F to occupy a fixed position; the relative movements of the discs F and M provide the desired modulations of the beams.

What is claimed is:

A device for detecting radiation having a spectrum which includes a portion of the spectrum of parasitic radiation, said device comprising an optical system comprising first, second and third optical elements of glass, germanium and an acrylic resin respectively and having different spectral responses, means passing a portion of the radiation to be detected through said first, second and third elements to form a first beam, means passing another portion of said radiation to be detected through only said first and second elements to form a second beam, means modulating said beams, a radiation sensitive element, and means projecting said first and second beams onto the same portion of said element, the spectral responses of said elements being such that said radiation to be detected is present in only one of said beams.

References Cited in the file of this patent

UNITED STATES PATENTS

| | | |
|---|---|---|
| 2,392,873 | Zahl | Jan. 15, 1946 |
| 2,674,155 | Gibson | Apr. 6, 1954 |
| 2,687,611 | Larsen | Aug. 31, 1954 |
| 2,710,559 | Heitmuller et al. | June 14, 1955 |
| 2,775,160 | Foskett et al. | Dec. 25, 1956 |
| 2,900,866 | Coates et al. | Aug. 25, 1959 |
| 2,909,924 | Flook et al. | Oct. 27, 1959 |

OTHER REFERENCES

Article by Gibson, "A Two-Color Infra-Red Radiation Pyrometer," Journal of Scientific Instruments, vol. 28, May 1951, pages 153–155.